United States Patent
Song et al.

(10) Patent No.: US 8,368,840 B2
(45) Date of Patent: Feb. 5, 2013

(54) BACKLIGHT ASSEMBLY AND LIQUID CRYSTAL DISPLAY HAVING THE SAME

(75) Inventors: Min-Young Song, Seoul (KR); Jin-Sung Choi, Yongin-si (KR); Byung-Yun Joo, Seoul (KR); Sang-Hoon Lee, Cheonan-si (KR); Dong-Kwan Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 887 days.

(21) Appl. No.: 12/497,488

(22) Filed: Jul. 2, 2009

(65) Prior Publication Data

US 2010/0066946 A1    Mar. 18, 2010

(30) Foreign Application Priority Data

Sep. 18, 2008 (KR) .................. 10-2008-0091704

(51) Int. Cl.
G02F 1/13357    (2006.01)
F21V 5/00    (2006.01)
(52) U.S. Cl. ........................ 349/64; 362/97.2
(58) Field of Classification Search ............... 349/62, 349/64, 70; 359/599; 362/97.1, 97.2, 217.02, 362/223, 224, 243, 245, 246, 217.08, 217.09, 362/235
See application file for complete search history.

(56) References Cited

U.S. PATENT DOCUMENTS

| 2006/0256580 | A1 | 11/2006 | Kang et al. |
| 2007/0165154 | A1 | 7/2007 | Whitney et al. |
| 2007/0268721 | A1 | 11/2007 | Jung et al. |
| 2008/0002391 | A1 | 1/2008 | Lee |
| 2008/0112163 | A1 | 5/2008 | Chuang et al. |
| 2008/0117630 | A1 | 5/2008 | Durvasula et al. |
| 2008/0158906 | A1 | 7/2008 | Park et al. |
| 2009/0262281 | A1 * | 10/2009 | Yun .............................. 349/64 |

FOREIGN PATENT DOCUMENTS

| CN | 201028402 Y | 2/2008 |
| EP | 1788302 A1 | 5/2007 |
| JP | 2004200139 A | 7/2004 |
| JP | 2005-117023 | 4/2005 |
| JP | 2007-087606 A | 4/2007 |
| JP | 2008177149 A | 7/2008 |
| KR | 1020060059104 A | 6/2006 |
| KR | 1020070021378 A | 2/2007 |
| WO | 2006/135202 A1 | 12/2006 |

OTHER PUBLICATIONS

International Search Report, EP 1788302 A1 corresponding to PCT/JP2005/016318, Dec. 4, 2009, 3 pages.

* cited by examiner

Primary Examiner — Dung T. Nguyen
Assistant Examiner — Tai Duong
(74) Attorney, Agent, or Firm — Innovation Counsel LLP

(57) ABSTRACT

A backlight assembly includes an optical member that diffuses light generated from lamps. The optical member includes first and second diffusion members that are designed to have light transmittance that complementarily vary according to areas. Thus, an optical member capable of supplying light having uniform brightness onto the whole display area of the LCD is easily designed.

20 Claims, 13 Drawing Sheets

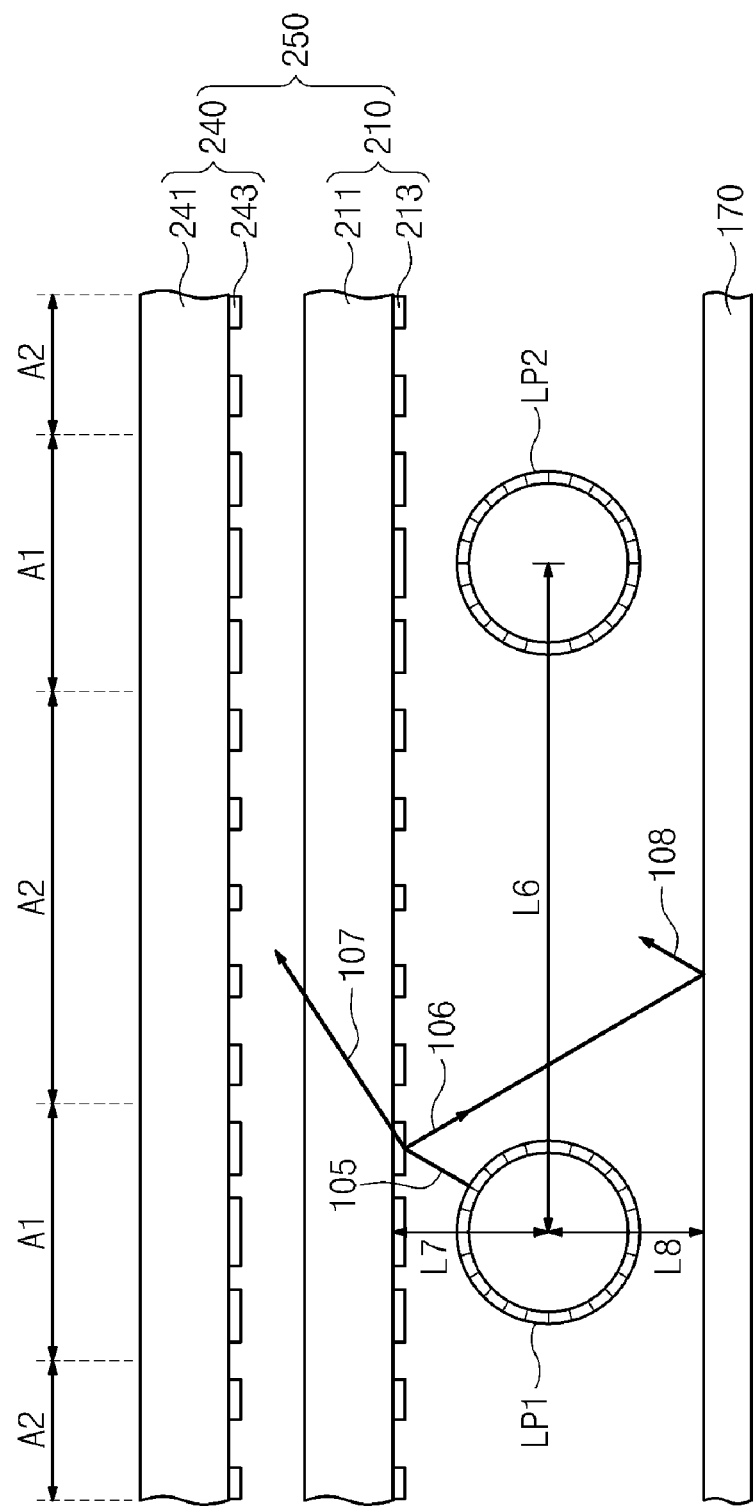

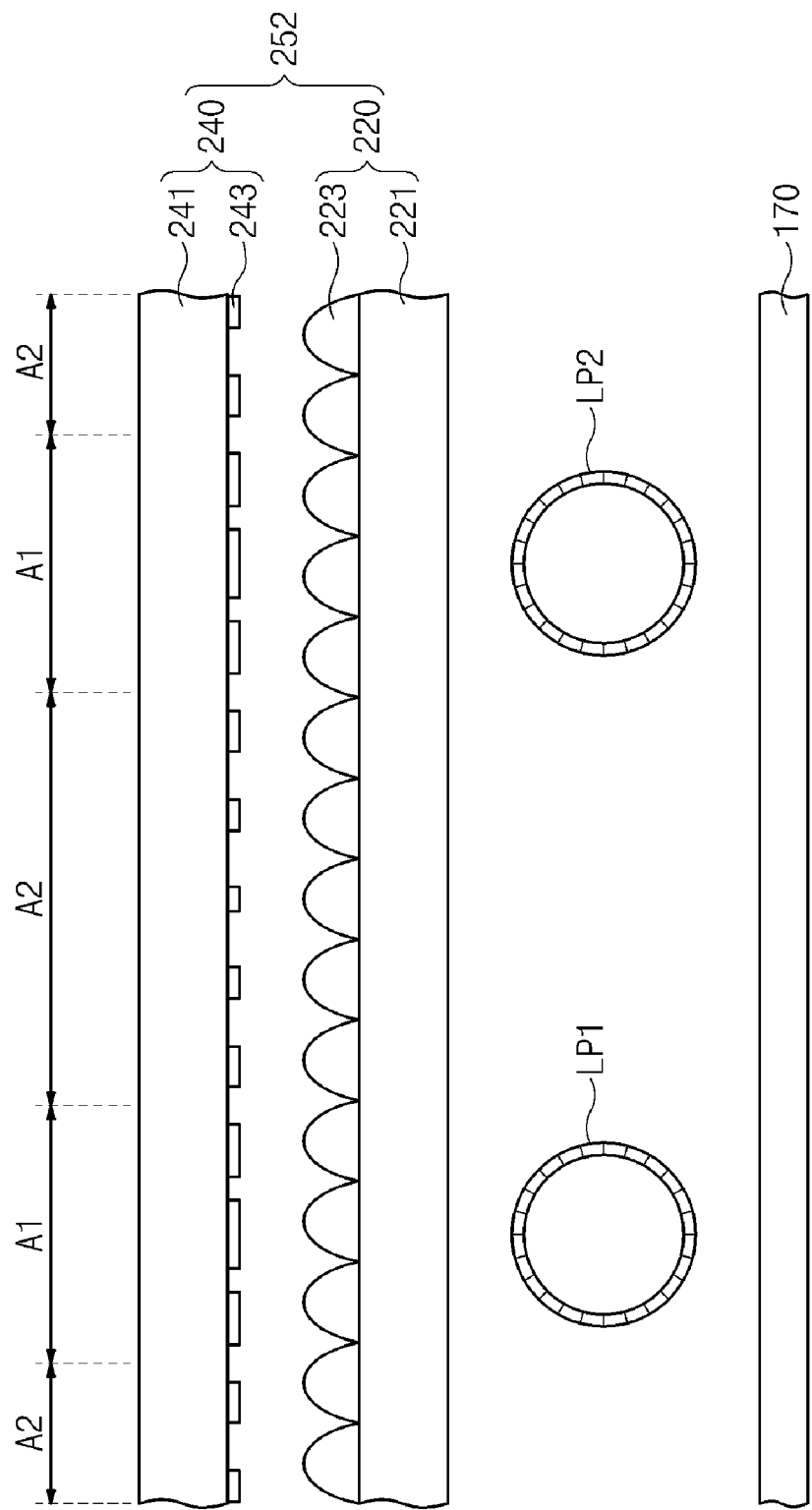

BACKLIGHT ASSEMBLY AND LIQUID CRYSTAL DISPLAY HAVING THE SAME

CROSS-REFERENCE TO RELATED APPLICATION

This application relies for priority upon Korean Patent Application No. 2008-91704 filed on Sep. 18, 2008, the contents of which are herein incorporated by reference in their entirety.

BACKGROUND

1. Field of the Invention

The present invention relates to a backlight assembly and a liquid crystal display having the same. More particularly, the present invention relates to a backlight assembly capable of uniformly supplying light and a liquid crystal display having the backlight assembly.

2. Description of the Related Art

A liquid crystal display (LCD) is a flat display apparatus that includes an LCD panel and a backlight assembly that supplies light to the LCD panel. The backlight assembly is classified into a direct-illumination type backlight assembly and an edge-illumination type backlight assembly according to the position of a lamp. The direct-illumination type backlight assembly is mainly employed in a large-size LCD, such as a television, and the edge-illumination type backlight assembly is mainly employed in a small-sized LCD, such as a mobile appliance or a notebook computer.

In general, the backlight assembly includes a lamp, a reflective plate, and a diffusion plate. The lamp generates light, and the reflective plate reflects the light, that travels in a direction away from the liquid crystal panel back toward the liquid crystal panel to improve the light efficiency. In addition, the diffusion plate is disposed between the lamp and the LCD panel to diffuse the light.

Recently, a distance between the diffusion plate and the lamp has become shortened in order to reduce the thickness of the LCD. However, if the distance between the diffusion plate and the lamp is shortened too much, the diffusion plate cannot effectively diffuse the light generated from the lamp. Without effective diffusion, brightness variation of the light occurs when the light is supplied to the LCD panel through the diffusion plate.

SUMMARY

Therefore, an exemplary embodiment of the present invention provides a backlight assembly capable of supplying light having uniform brightness onto a whole light receiving area.

Another exemplary embodiment of the present invention provides an LCD having such a backlight assembly.

In an exemplary embodiment of the present invention, a backlight assembly includes a plurality of lamps that generate light while being spaced apart from each other, and an optical member that receives the light from the lamps to diffuse the light. The optical member includes first and second diffusion members.

The second diffusion member has light transmittance lower than that of the first diffusion member in a first area corresponding to a position of the lamps and higher than that of the first diffusion member in a second area corresponding to a gap between two adjacent lamps.

In one embodiment of the present invention, a backlight assembly includes a first diffusion member and a second diffusion member. Such first diffusion member comprises a first base and first light-quantity adjusting members comprising a transflective material. These first light-quantity adjusting members are disposed on the first base to adjust the quantity of light exiting from the first base by adjusting a size of an area that overlaps the first base. Further in this embodiment, the second diffusion member comprises a second base and second light-quantity adjusting members comprising a transflective material, disposed on the second base to adjust the quantity of light exiting from the second base by adjusting a size of an area that overlaps the second base.

In another embodiment of the present invention, the first diffusion member includes a first base having a flat plate shape comprising a resin and diffusion beads formed in the resin; and the second diffusion member includes a second base also having a flat plate shape, comprising a resin and diffusion beads formed in the resin.

In another embodiment of the present invention, the centers of the first light-quantity adjusting elements and the second light-quantity adjusting elements are defined on the surfaces of the first and second bases, respectively, forming a diagonal square matrix on the plane of the surface of said first and second bases.

In another exemplary embodiment of the present invention, a backlight assembly includes a plurality of lamps that generate light while being spaced apart from each other, a first diffusion member that diffuses the light generated from the lamps, and a second diffusion member that diffuses the light that has passed through the first diffusion member.

The first diffusion member includes a first base, and first protrusions protruding from the first base in a lens shape to diffuse the light passing through the first base. The second diffusion member includes a second base, and light-quantity adjusting members including a transflective material and disposed on the second base to adjust quantity of light exiting from the second base by adjusting a size of an area that overlaps the second base.

In still another exemplary embodiment of the present invention, a backlight assembly includes a plurality of lamps that generate light while being spaced apart from each other, a first diffusion member that diffuses the light generated from the lamps, and a second diffusion member that diffuses the light that has passed through the first diffusion member.

The first diffusion member includes a first base, and first protrusions protruding from the first base in a lens shape to diffuse the light passing through the first base. The second diffusion member includes a second base, and second protrusions protruding from the second base in a lens shape to diffuse the light that has been diffused by the first protrusions. The second protrusions have a surface curvature smaller than a surface curvature of the first protrusions.

In still another exemplary embodiment of the present invention, a liquid crystal display includes a plurality of lamps spaced apart from each other, a liquid crystal display panel receiving the light to display an image, and an optical member provided between the lamps and the liquid crystal display panel to diffuse the light, which is generated from the lamps and forwarded to the liquid crystal display panel.

The optical member includes a first diffusion member that diffuses the light, and a second diffusion member having light transmittance lower than that of the first diffusion member in a first area corresponding to a position of the lamps and higher than that of the first diffusion member in a second area corresponding to a gap between two adjacent lamps. In still another exemplary embodiment of the present invention, a liquid crystal display includes a plurality of lamps spaced apart from each other, a liquid crystal display panel that receives the light to display an image, a first diffusion member that diffuses the light generated from the lamps, and a second diffusion member that diffuses the light that has passed through the first diffusion member.

The first diffusion member includes a first base, and first protrusions protruding from the first base in a lens shape to diffuse the light passing through the first base. The second diffusion member includes a second base, and light-quantity adjusting members including a transflective material and disposed on the second base to adjust quantity of light exiting from the base by adjusting a size of an area that overlaps the second base.

In yet another embodiment of the present invention, the second base is provided with diffusion beads including a transflective material being fixed to a surface of the second base to diffuse the light passing through the second diffusion member.

According to the above, the backlight assembly includes first and second diffusion members that are designed to have light transmittance that may complementarily vary according to areas. Thus, an optical member capable of supplying light having uniform brightness onto the whole display area of the LCD can be easily designed.

BRIEF DESCRIPTION OF THE DRAWINGS

The above and other advantages of the present invention will become readily apparent by reference to the following detailed description when considered in conjunction with the accompanying drawings wherein:

FIG. 4 is a sectional view showing an optical member, a lamp, and a reflective plate of an LCD illustrated in FIG. 1;

FIG. 8 is a sectional view showing an optical member of an LCD according to a third exemplary embodiment of the present invention;

DESCRIPTION OF THE EMBODIMENTS

Figure 1:
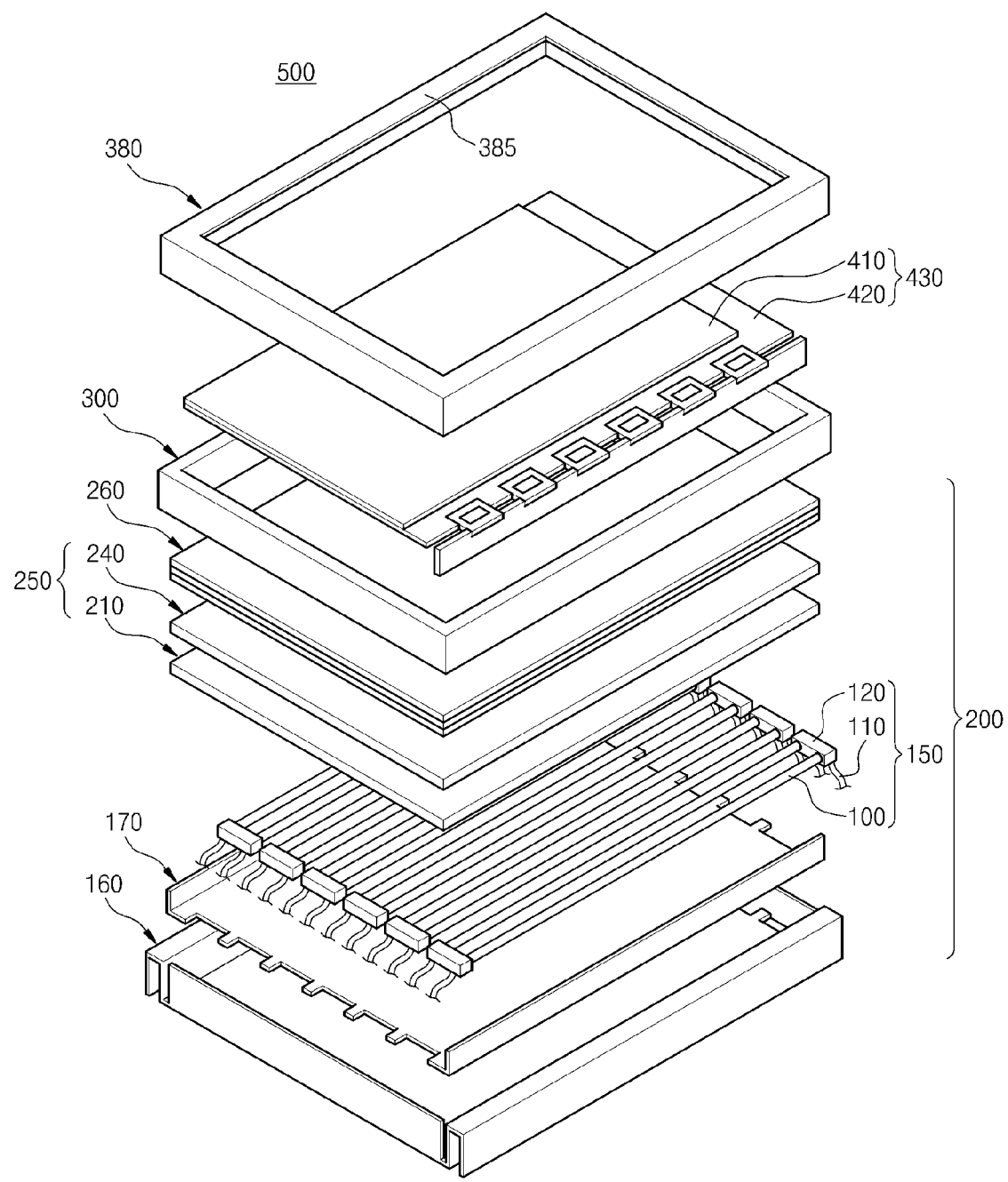
FIG. 1 is an exploded perspective view showing an LCD according to a first exemplary embodiment of the present invention.

Hereinafter, embodiments of the present invention will be explained in detail with reference to the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. In the drawings, the sizes of layers and regions may be depicted out of proportion for the sake of clarity. Also, the same reference numerals are used to designate the same elements throughout the drawings.

FIG. 1 is an exploded perspective view showing an LCD according to a first exemplary embodiment of the present invention.

Referring to FIG. 1, an LCD 500 includes a backlight assembly 200 that supplies light, a bottom chassis 160 providing a receiving cavity, a top chassis 380 coupled with the bottom chassis 160, and an LCD panel 430 that displays an image by receiving the light from the backlight assembly 200.

In the above LCD 500, the LCD panel 430 is provided above the backlight assembly 200 to display the image by receiving the light from the backlight assembly 200. The LCD panel 430 includes a color filter substrate 410, a thin film transistor substrate 420, and a liquid crystal layer (not shown) interposed between the color filter substrate 410 and the thin film transistor substrate 420.

The thin film transistor substrate 420 includes pixels. In addition, a plurality of thin film transistors are provided on the thin film transistor substrate 420 while corresponding to the pixels in one-to-one correspondence, and pixel electrodes (not shown) are formed on thin film transistor substrate 420 and electrically connected to the thin film transistors in one-to-one correspondence. One of red, green and blue color filters is formed on the color filter substrate 410 while corresponding to the pixel in one-to-one correspondence. A common electrode is formed on the color filter substrate 410 while facing the pixel electrode. As a result, directors of the liquid crystal are changed according to the electric field generated by the pixel electrodes and the common electrode, thereby adjusting quantity of light passing through the LCD panel 430.

The backlight assembly 200 includes a light source 150, a reflective plate 170, an optical member 250, and optical sheets 260.

The reflective plate 170 is provided below the light source 150 to reflect the light that is generated from the light source 150 and travels toward the bottom of the bottom chassis 160. As a result, the light is forward to the LCD panel 430 by the reflective plate 170, so that the light efficiency is improved when the image is displayed on the LCD panel 430.

The light source 150 is provided between the LCD panel 430 and the reflective plate 170. The light source 150 includes a plurality of lamps 100 that generate the light, a lamp electrode line 110, and a lamp holder 120. Two adjacent lamps 100 are combined as a pair and plural pairs of lamps 100 are disposed on the reflective plate 170 at a regular interval. The lamp electrode line 110 is electrically connected to an inverter (not shown) serving as a power supply in order to supply power generated from the inverter to the lamps 100. The lamp holder 120 is coupled to an end of each lamp 100 to fix the lamps 100 into the backlight assembly 200.

The optical member 250 is provided between the lamps 100 and the LCD panel 430 to diffuse the light generated from the lamps 100. As a result, the light having uniform brightness can be supplied to the whole display area of the LCD panel 430.

The optical member 250 includes a first diffusion plate 210 and a second diffusion plate 240. In the backlight assembly 200, the first diffusion plate 210 is closer to the lamps 100 than the second diffusion plate 240. Thus, the first diffusion plate 210 diffuses the light generated from the lamps 100 and the second diffusion plate 240 diffuses the light that has been diffused by the first diffusion plate 210.

Hereinafter, the light diffusion principle of the first diffusion plate 210 will be described as an example. A plurality of first light-quantity adjusting members 213 (see, FIG. 2A) includes transflective material that reflects and transmits light, such as titanium dioxide ($TiO_2$). The first light-quantity adjusting members 213 are formed on a light incident surface of the first diffusion plate 210 in such a manner that the first light-quantity adjusting members 213 may have sizes that vary according to their positions on the first diffusion plate 210. Thus, transmittance of the light passing through the first light-quantity adjusting members 213 is changed according to the size of the first light-quantity adjusting members 213, so that the first diffusion plate 210 may have light transmittance that may vary according to areas thereof. Therefore, the light transmittance of the first diffusion plate 210 can be reduced by enlarging the size of the first light-quantity adjusting members 213 in an area that overlaps the lamps 100 when viewed in a plan view, and the light transmittance of the first diffusion plate 210 can be increased by reducing the size of the first light-quantity adjusting members 213 in an area that lays over the space between the lamps 100 when viewed in a plan view. As a result, the brightness of the light passing through the first diffusion plate 210 can be uniform. This will be described later in more detail with reference to FIGS. 2A to 2C.

In the backlight assembly 200, the optical sheets 260 are disposed above the optical member 250. The optical sheets 260 may include flexible sheets. The optical sheets 260 include prism sheets that collect the light output from the optical member 250 to improve front brightness and diffusion sheets that diffuse the light output from the optical member 250.

The bottom chassis 160 includes a bottom wall and sidewalls extending from the bottom wall. The bottom wall and sidewalls define a receiving cavity in which the backlight assembly 200 is accommodated. The top chassis 380 is coupled to the sidewalls of the bottom chassis 160. In the LCD 500, a middle mold 300 is provided between the bottom chassis 160 and the top chassis 380. The middle mold 300 allows the LCD panel 430 to be stably fixed in the LCD 500.

Figure 2A:
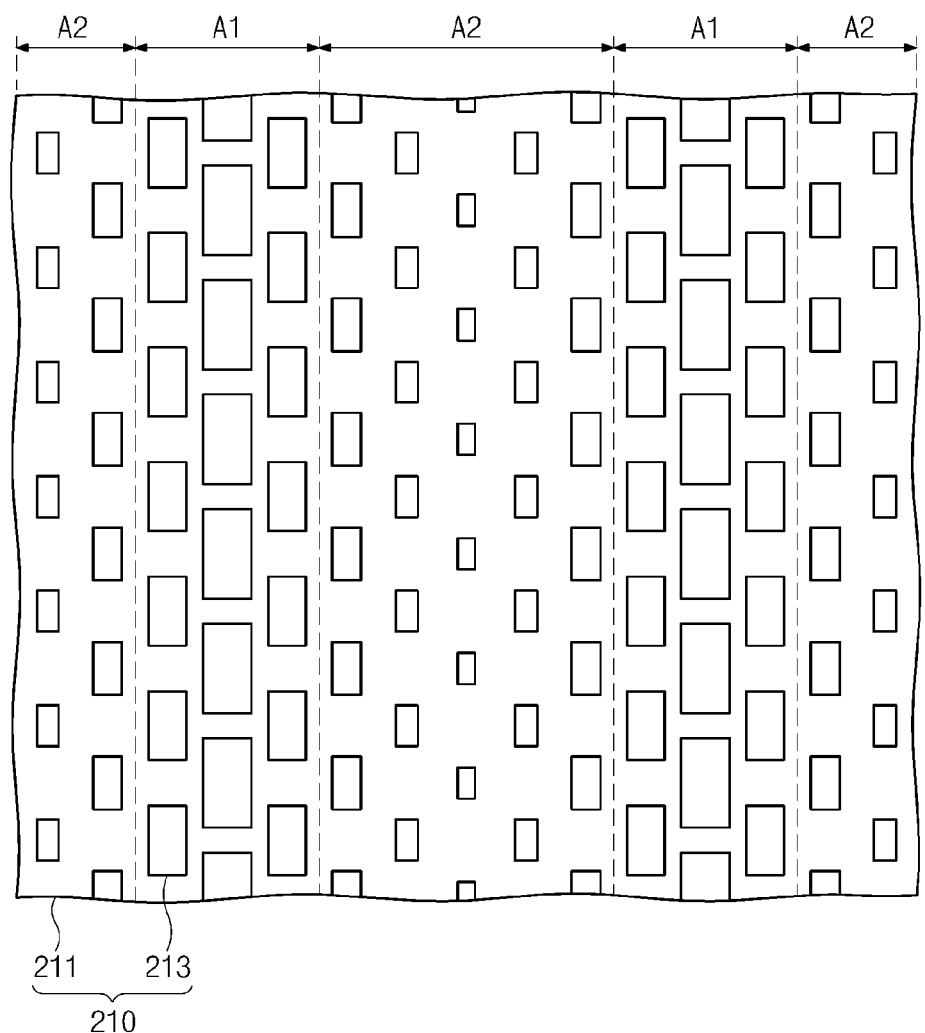
FIG. 2A is a plan view showing a first diffusion plate illustrated in FIG. 1.
Figure 2B:
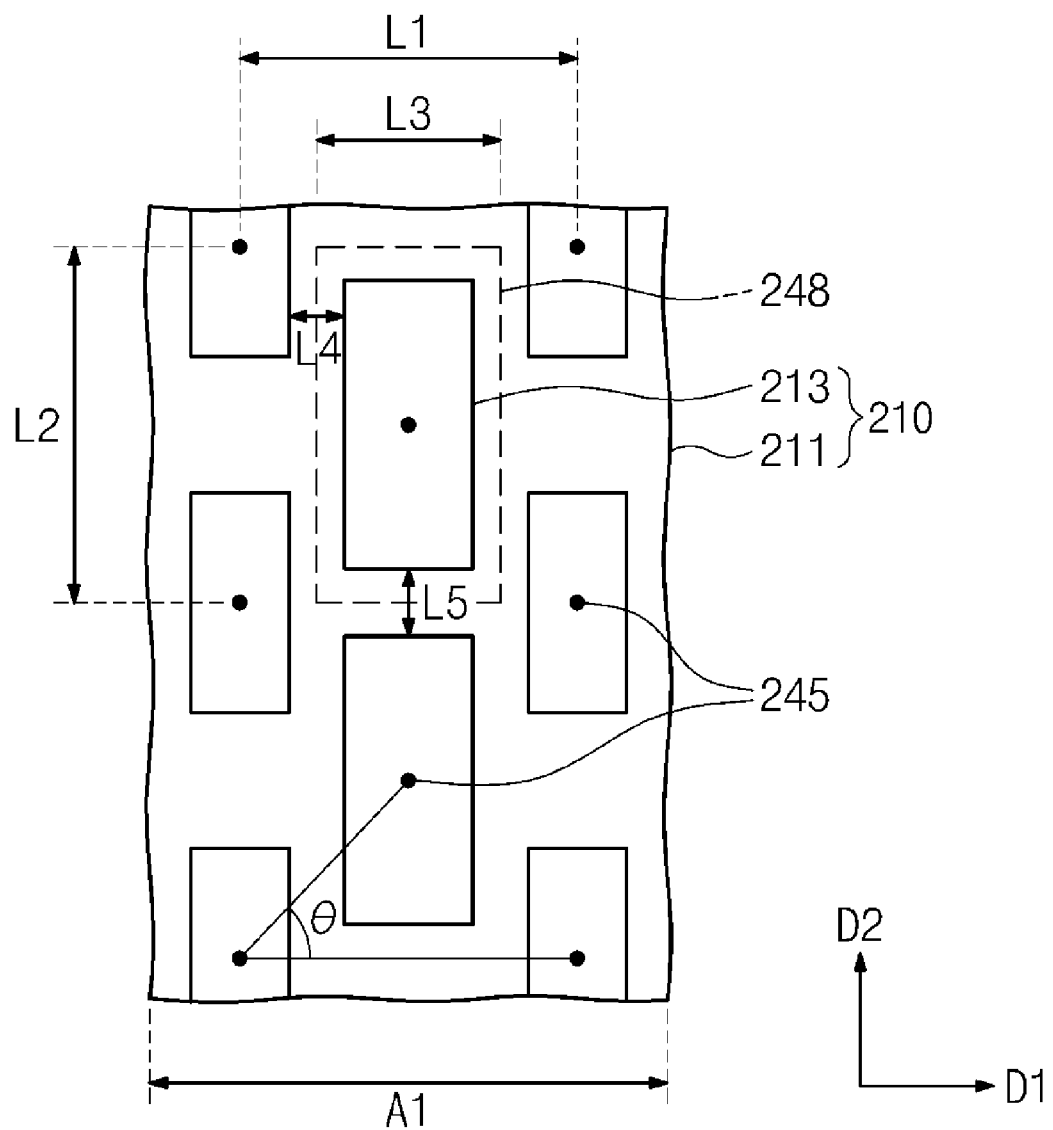
FIG. 2B is an enlarged view showing a first area of a first diffusion plate illustrated in FIG. 2A.
Figure 2C:
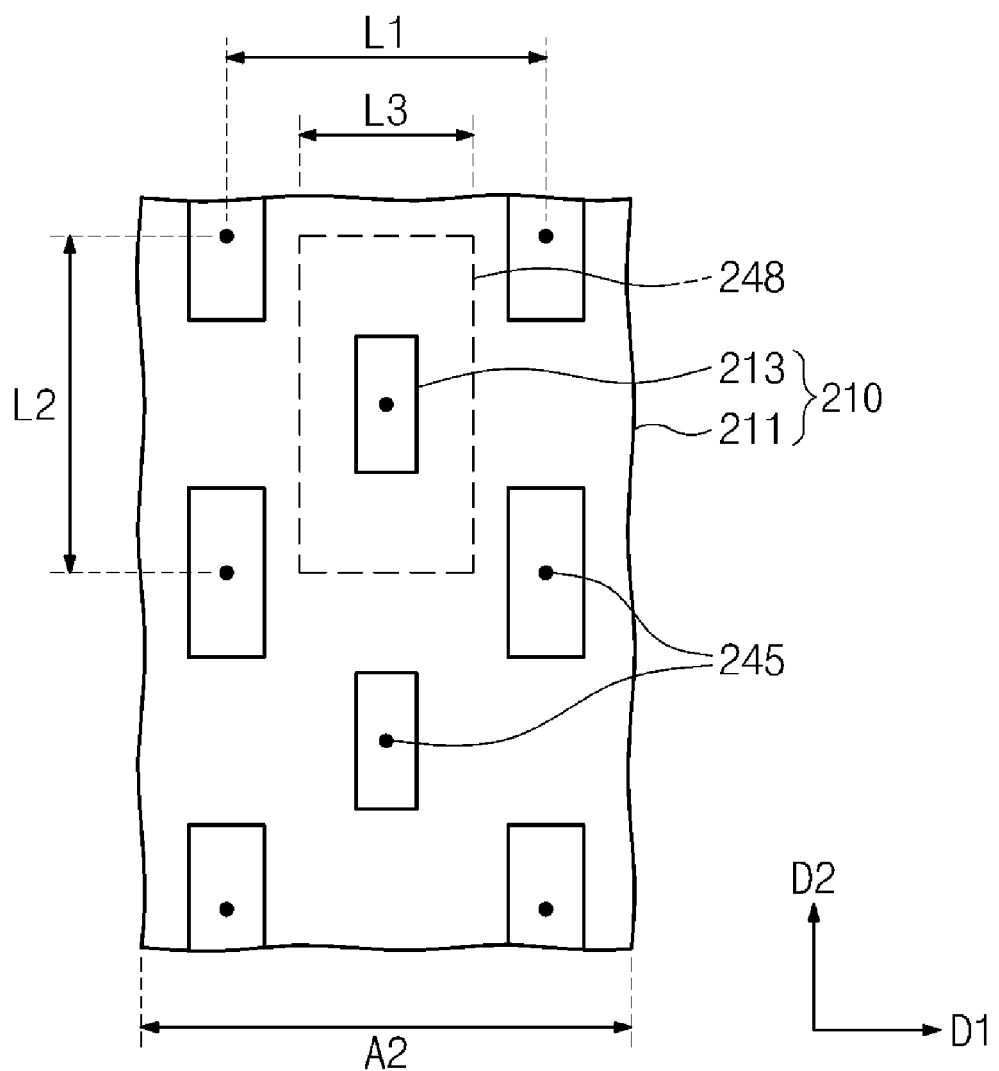
FIG. 2C is an enlarged view showing a second area of a first diffusion plate illustrated in FIG. 2A.

FIG. 2A is a plan view showing the first diffusion plate illustrated in FIG. 1, FIG. 2B is an enlarged view showing a first area of a first diffusion plate illustrated in FIG. 2A, and FIG. 2C is an enlarged view showing a second area of a first diffusion plate illustrated in FIG. 2A.

Referring to FIG. 2A, the first diffusion plate 210 includes a first base 211 and first light-quantity adjusting members 213.

The first base 211 has a flat plate shape and includes resin, such as polymethylmethacrylate (PMMA), polycarbonate (PC), or polystyrene (PS). The first base 211 is provided therein with diffusion beads including material such as titanium dioxide ($TiO_2$). In addition, the base 211 has first areas A1 that lay over the lamps 100 and second areas A2 that lay over the gaps between two adjacent lamps 100 when viewed in a plan view.

The first light-quantity adjusting members 213 are provided on the first base 211. Each first light-quantity adjusting member 213 has a rectangular shape when viewed in a plan view. The first light-quantity adjusting members 213 include transflective material, such as titanium dioxide ($TiO_2$). Thus, as the light reaches one of the first light-quantity adjusting members 213, about 62% of the light passes through the light-quantity adjusting member 213, and about 38% of the light is reflected from the light-quantity adjusting member 213, so that the proceeding route of the light is changed. Therefore, as the density of the first light-quantity adjusting members 213 increases in a unit area of the first base 211, the light transmittance of the first diffusion plate 210 is reduced in the unit area.

The first light-quantity adjusting members 213 can be aligned on the base 211 according to two rules. According to one rule, the size of the first light-quantity adjusting members 213 is gradually reduced from the first area A1 to the second area A2 when viewed in a plan view. In this case, the light transmittance of the first diffusion plate 210 can be gradually increased from the first area A1 to the second area A2 by the first light-quantity adjusting members 213.

As described above, the first area A1 overlaps the lamps 100 and the second area A2 overlaps the gap between two adjacent lamps 100 in the base 211 when viewed in a plan view. Therefore, quantity of light passing through the first diffusion plate 210 may gradually increase from the first area A1 to the second area A2 due to the first light-quantity adjusting members 213.

Meanwhile, although the first light-quantity adjusting members 213 have sizes that are different according to their positions on the first base 211, a ratio of a long side to a short side of each first light-quantity adjusting member 213 is consistently in a range of 1:1 to 1:2. Length of the short side is about 0.8 mm to about 2 mm in the first area A1, and is about 0.2 mm to about 0.8 mm in the second area A2.

Figure 3:
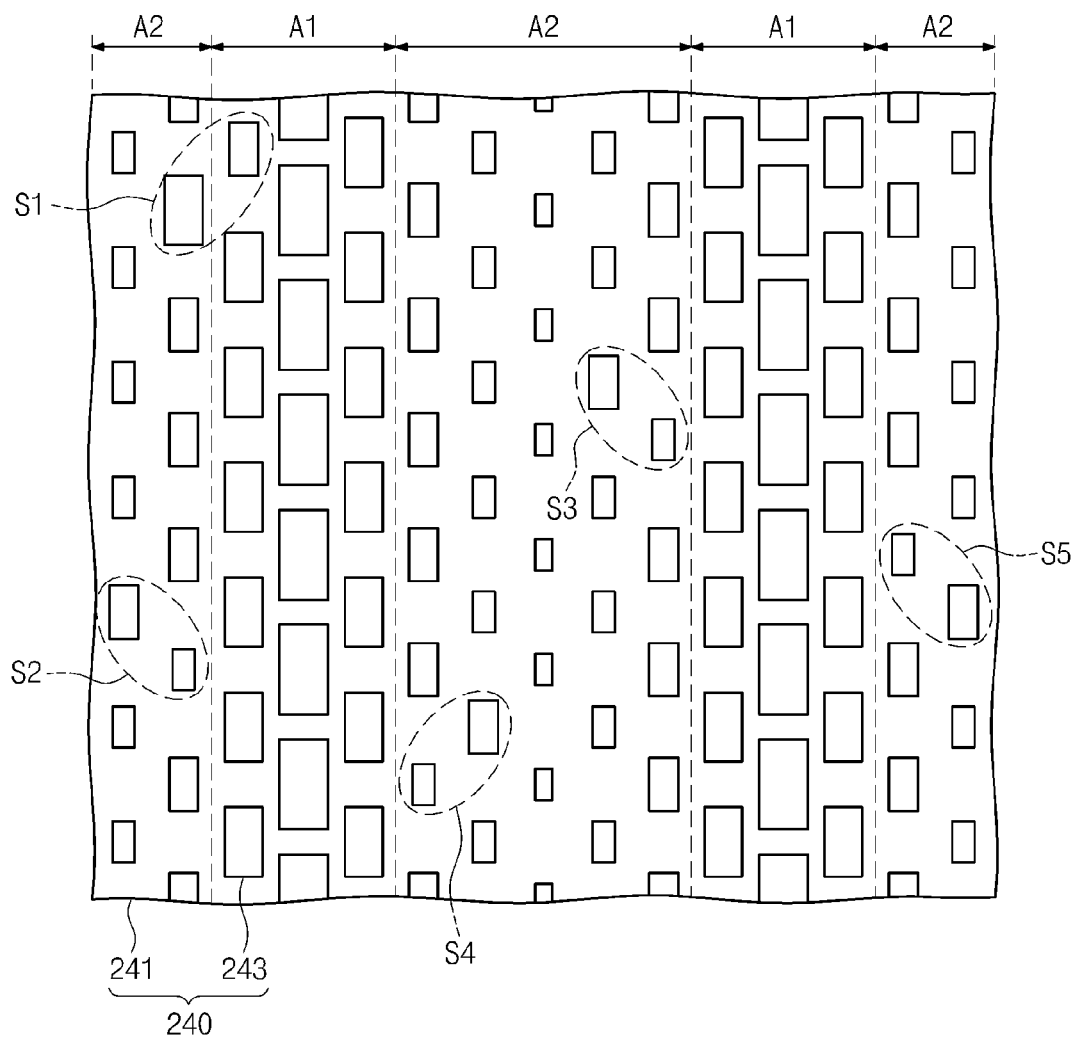
FIG. 3 is a plan view showing a second diffusion plate illustrated in FIG. 1.

Referring to FIG. 2B, according to the other rule, the first light-quantity adjusting members 213 are disposed on the first base 211 in such a manner that the center of each first light-quantity adjusting member 213 matches with the center of each point 245 defined on the first base 211. The points 245 are arranged in the first direction D1 at a regular interval, in which first length L1 between two points adjacent to each other in the first direction D1 is about 1.5 mm to about 3 mm. In addition, the points 245 are arranged in the second direction D2 substantially perpendicular to the first direction D1 at a regular interval, and a second length L2 between two points adjacent to each other in the second direction D2 is about 1.0 mm to about 2 mm. In one embodiment of the invention, the points 245 are arranged in a staggered configuration, forming a diagonal square matrix across the first area A1 and the second area A2. This embodiment is depicted in FIGS. 2A, 2B, and 3.

Two first light-quantity adjusting members 213 adjacent to each other in the first direction D1 are spaced apart from each other by a fourth length L4, and two first light-quantity adjusting members 213 adjacent to each other in the same column is spaced apart from each other by a fifth length L5. The fourth and fifth lengths L4 and L5 are about 0.06 mm to about 0.3 mm, respectively. In addition, among the angles defined by the center points of three adjacent light-quantity adjusting members 213, the acute angle θ is about 30° to about 60°.

Meanwhile, a rectangle having a short side corresponding to third length L3, which corresponds to a half of first length L1, and a long side corresponding to second length L2 is defined as a unit rectangle 248. As shown in FIG. 2B, L2 is the distance between center points of two adjacent first light-quantity adjusting members 213 that are positioned along the direction D2. The percentage of the unit rectangle 248 that is covered by one first light-quantity adjusting members 213 in the unit rectangle 248 is defined as a first packing density. In the first area A1, the first packing density is about 60% to about 80%. In more detail, the first packing density is about 76.5% in the first area A1. As mentioned above, since the size of the first light-quantity adjusting members 213 is gradually reduced from the first area A1 to the second area A2, the first packing density has a maximum value in the first area A1.

Referring to FIG. 2C, in the second area A2, the first packing density is about 10% to about 30%. In more detail, the first packing density is about 20.5% in the second area A2. Since the size of the first light-quantity adjusting members 213 is gradually reduced from the first area A1 to the second area A2, the first packing density has a minimum value in the second area A2.

FIG. 3 is a plan view showing the second diffusion plate illustrated in FIG. 1.

Referring to FIG. 3, the second diffusion plate 240 includes a second base 241 and second light-quantity adjusting members 243 provided on the second base 241. The second base 241 has a flat plate shape and includes resin, such as polymethylmethacrylate (PMMA), polycarbonate (PC), or polystyrene (PS). The second base 241 is provided therein with diffusion beads including a transflective material such as titanium dioxide ($TiO_2$). In addition, the base 241 has first areas A1 that overlap the lamps 100 and second areas A2 that overlap gaps between two adjacent lamps 100 when viewed in a plan view.

The second light-quantity adjusting members 243 have the same functions as those of the first light-quantity adjusting members 213, which have been described with reference to FIG. 2A. However, the arrangement of the second light-quantity adjusting members 243 is slightly different from that of the first light-quantity adjusting members 213. In more detail, the second light-quantity adjusting members 243 are arranged according to two rules similarly to the first light-quantity adjusting members 213 except that the second light-quantity adjusting members 243 arranged in a single column (along the direction D2) may have different sizes. Specifically, the second light-quantity adjusting members 243 in first to fifth switching areas S1 to S5 may have sizes different from sizes of other second light-quantity adjusting members 243 arranged in the same columns.

For instance, two second light-quantity adjusting members 243 provided in the first switching area S1 have sizes different from the sizes of the second light-quantity adjusting members 243 arranged in the same columns. In more detail, the sizes of the two second light-quantity adjusting members 243 provided in the first switching area S1 may be increased or decreased by ±20% as compared with sizes of other second light-quantity adjusting members 243 arranged in the same columns.

If some of the second light-quantity adjusting members 243 are randomly arranged in the first to fifth switching areas S1 to S5 regardless of the two rules described with reference to FIG. 2A, brightness variation between adjacent areas may be reduced when the light is supplied to the LCD 500 through the second diffusion plate 240. As a result, the brightness of light can be more uniform over the whole display area of the LCD.

Meanwhile, a ratio of an area of one second light-quantity adjusting member 243 in the unit rectangle 248 is defined as a second packing density. In the first area A1, the second packing density is about 80% to about 90%. In more detail, the second packing density is about 85.4% in the first area A1. As mentioned above, since the size of the second light-quantity adjusting members 243 is gradually reduced from the first area A1 to the second area A2, the second packing density has a maximum value in the first area A1.

In the second area A2, the second packing density is about 10% to about 30%. In more detail, the second packing density is about 16.5% in the second area A2. Since the size of the second light-quantity adjusting members 243 is gradually reduced from the first area A1 to the second area A2, the second packing density has a minimum value in the second area A2. That is, when the second packing density is compared with the first packing density described with reference to FIGS. 2B and 2C, the second packing density is higher than the first packing density in the first area A1, and the same as or lower than the first packing density in the second area A2.

FIG. 4 is a sectional view showing the optical member, the lamp, and the reflective plate of the LCD illustrated in FIG. 1.

Referring to FIG. 4, first and second lamps LP1 and LP2 are provided above the reflective plate 170 and adjacent to each other. The first and second diffusion plates 210 and 240 are sequentially positioned above the first and second lamps LP1 and LP2.

A distance between the centers of the first and second lamps LP1 and LP2 corresponds to sixth length L6 of about 20 mm to about 28 mm. In addition, a distance between the center of the first lamp LP1 and the first diffusion plate 210 corresponds to seventh length L7 of about 6 mm to about 7 mm. Further, a distance between the center of the first lamp LP1 and the reflective plate 170 corresponds to eighth length L8 of about 3 mm to about 4 mm.

If a first light 105 is generated from the first lamp LP1, the first light 105 reaches the first light-quantity adjusting members 213. Some of the first light 105 is reflected from the first light-quantity adjusting members 213, so that a second light 106 forwarding to the reflective plate 170 is generated. In addition, some of the first light 105 becomes a third light 107 that passes through the first base 211 via the first light-quantity adjusting members 213, and the second light 106 is reflected from the reflective plate 170, so that a fourth light 108 forwarding to the first diffusion plate 210 is generated.

Figure 5A:
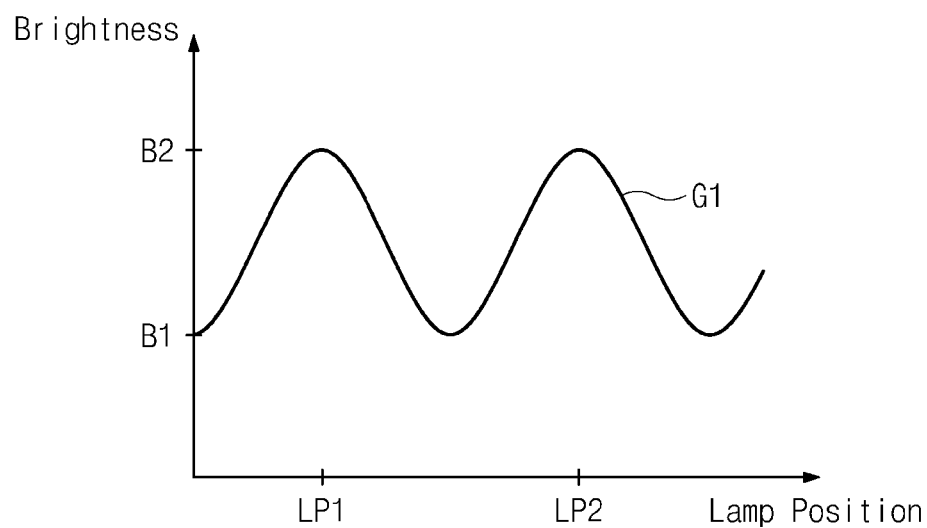
FIGS. 5A to 5D are graphs showing relation between a lamp position and brightness according to the structure of an optical member.
Figure 5B:
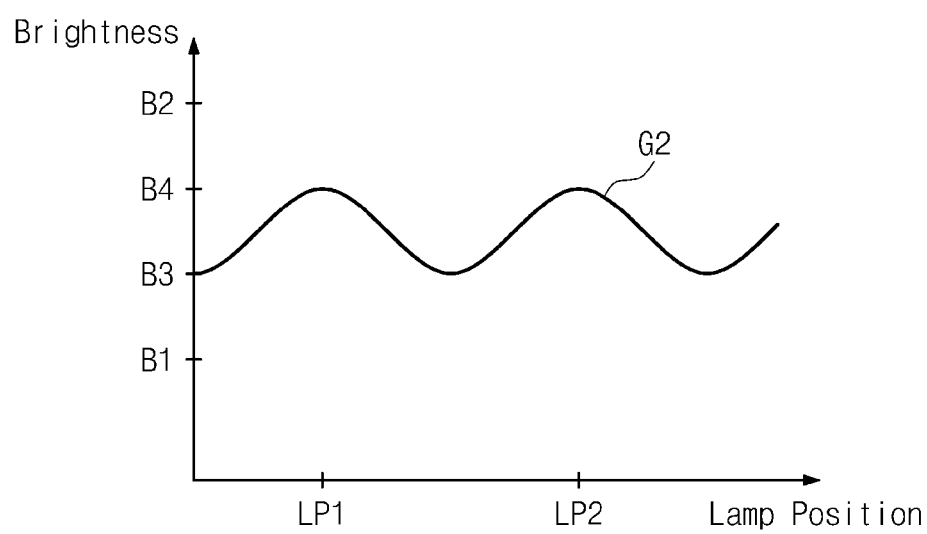
Figure 5C:
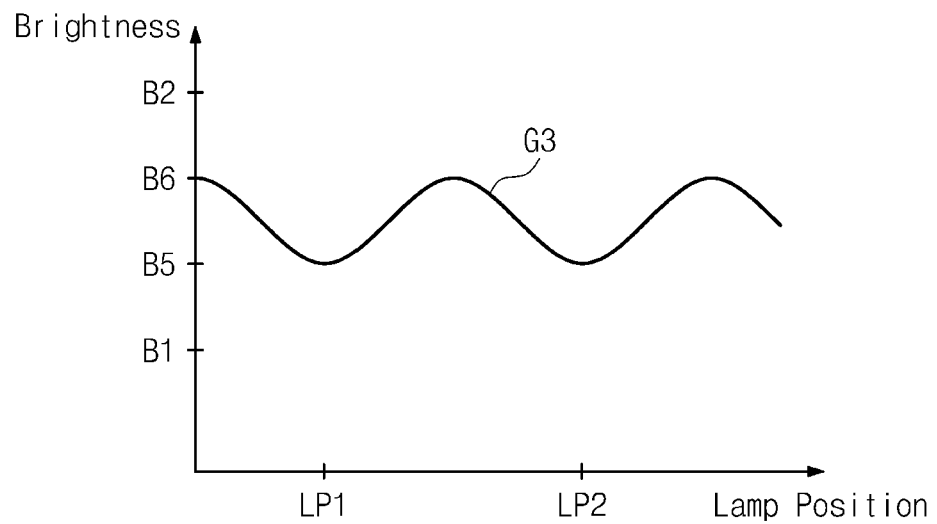
Figure 5D:
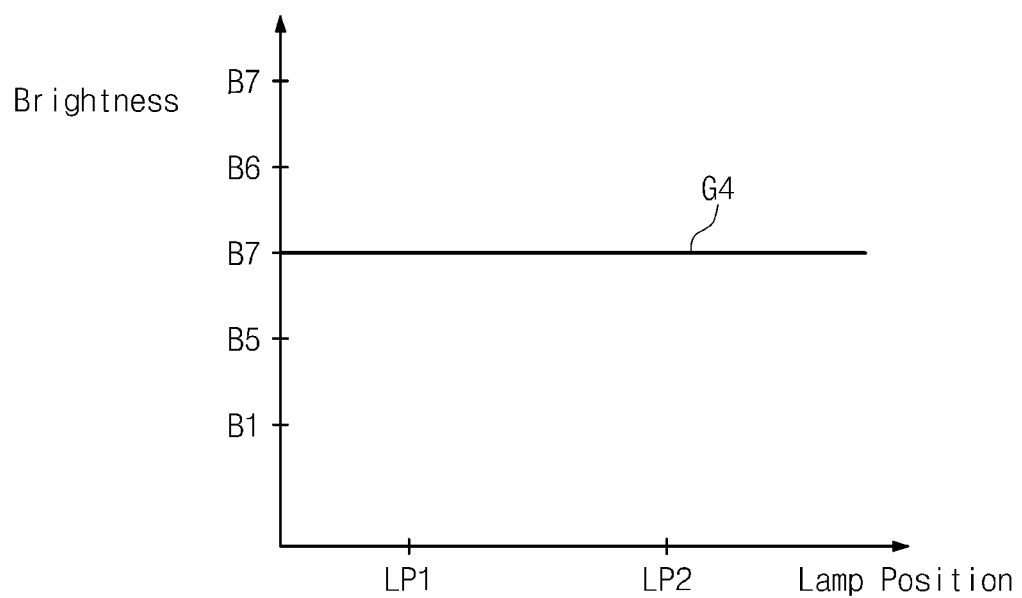

FIGS. 5A to 5D are graphs showing relation between a lamp position and brightness according to the structure of the optical member. In more detail, FIG. 5A is a graph showing the brightness of light generated from the backlight assembly according to the lamp position when the backlight assembly 200 has no optical member 250, FIG. 5B is a graph showing the brightness of light generated from the backlight assembly according to the lamp position when the optical member 250 consists of the first diffusion plate 210, and FIG. 5C is a graph showing the brightness of light generated from the backlight assembly according to the lamp position when the optical member 250 consists of the second diffusion plate 240. In addition, FIG. 5D is a graph showing the brightness of light generated from the backlight assembly according to the lamp position when the optical member 250 consists of the first and second diffusion plates 210 and 240.

Referring to the graph G1 shown in FIG. 5A, when the backlight assembly 200 has no first and second diffusion plates 210 and 240, the light generated from the backlight assembly 200 has first brightness B1 corresponding to an area between two adjacent lamps, and second brightness B2, which is higher than the first brightness B1, corresponding to the position of the first and second lamps LP1 and LP2.

Referring to the graph G2 shown in FIG. 5B, when the optical member 250 consists of the first diffusion plate 210, the light generated from the backlight assembly 200 has a third brightness B3, which is higher than the first brightness B1, corresponding to an area between two adjacent lamps, and fourth brightness B4, which is lower than the second brightness B2, corresponding to the position of the first and second lamps LP1 and LP2. That is, when the backlight assembly 200 consists of the first diffusion plate 210, the brightness of the light generated from the backlight assembly 200 is more uniform than the brightness of the light generated from the backlight assembly having no first and second diffusion plates 210 and 240.

Referring to the graph G3 shown in FIG. 5C, when the optical member 250 consists of the second diffusion plate 240, the light generated from the backlight assembly 200 has sixth brightness B6, which is higher than the first brightness B1, corresponding to an area between two adjacent lamps, and fifth brightness B5, which is lower than the second brightness B2, corresponding to the position of the first and second lamps LP1 and LP2. That is, when the backlight assembly 200 consists of the second diffusion plate 240, the brightness of the light generated from the backlight assembly 200 is more uniform than the brightness of the light generated from the backlight assembly having no first and second diffusion plates 210 and 240. In addition, different from the case in which the optical member 250 consists of the first diffusion plate 210, if the optical member 250 consists of the second diffusion plate 240, the brightness of light generated from the backlight assembly 200 corresponding to the position of the first and second lamps LP1 and LP2 is lower than the brightness of the light generated from the backlight assembly 200 corresponding to the gap between two adjacent lamps.

Referring again to FIGS. 2B, 2C and 3, the graph G3 is inverse to the graph G2 due to the reason as follows. The first reason is that the second packing density is higher than the first packing density in the first area A1 and lower than the first packing density in the second area A2. The second reason is that the second packing density is remarkably lowered from the first area A1 to the second area A2 as compared with the first packing density.

Referring to the graph G4 shown in FIG. 5D, when the optical member 250 consists of the first and second diffusion plate 210 and 240, the light generated from the backlight assembly 200 has seventh brightness B7. That is, when the optical member 250 consists of the first and second diffusion plates 210 and 240, the brightness of light generated from the backlight assembly can be more uniform as compared with the cases described above with reference to FIGS. 5A to 5C.

Figure 6:
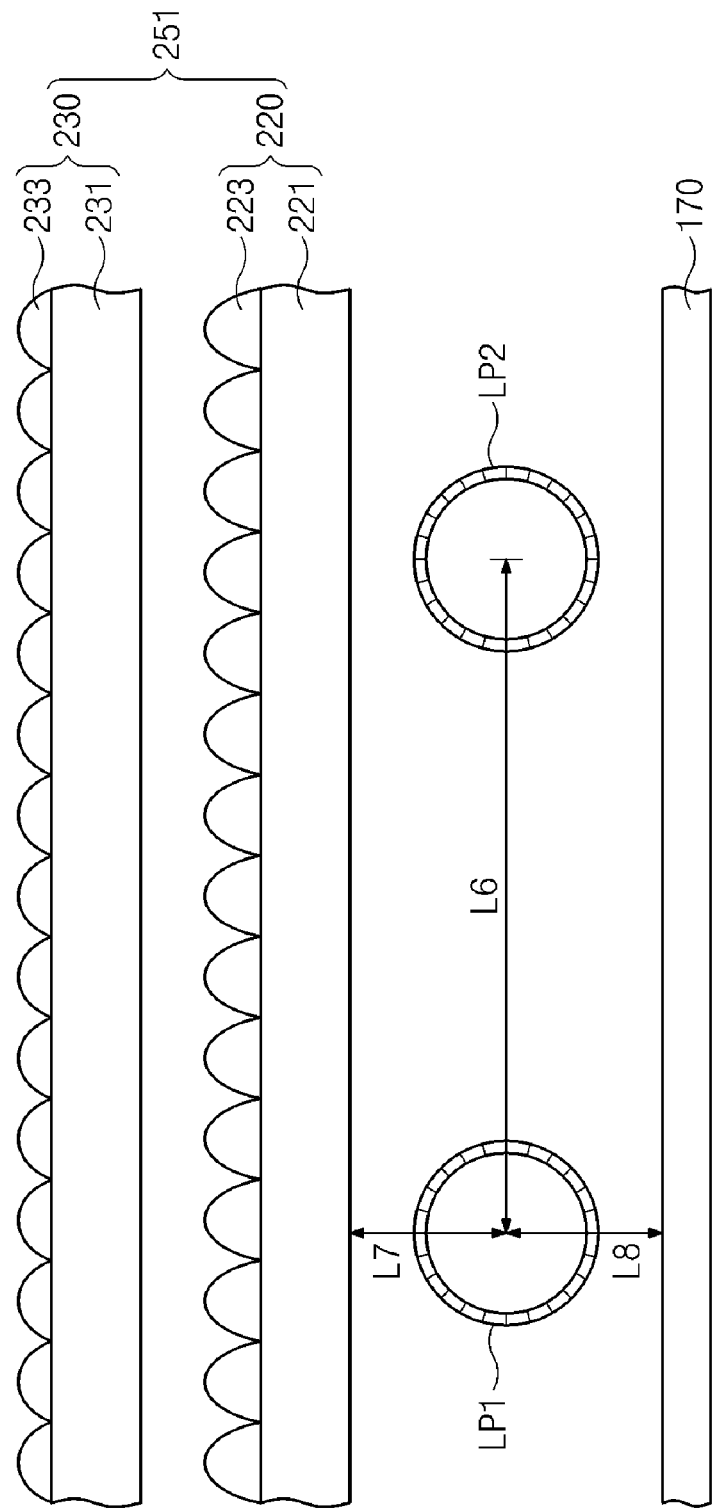
FIG. 6 is a sectional view showing an optical member of an LCD according to a second exemplary embodiment of the present invention.
Figure 7A:
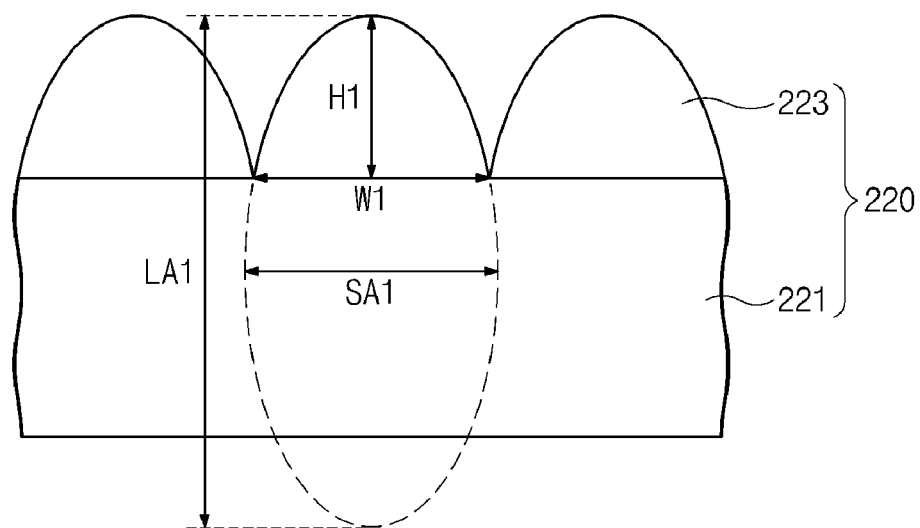
FIGS. 7A and 7B are enlarged sectional views showing first and second protrusions illustrated in FIG. 6, respectively.
Figure 7B:
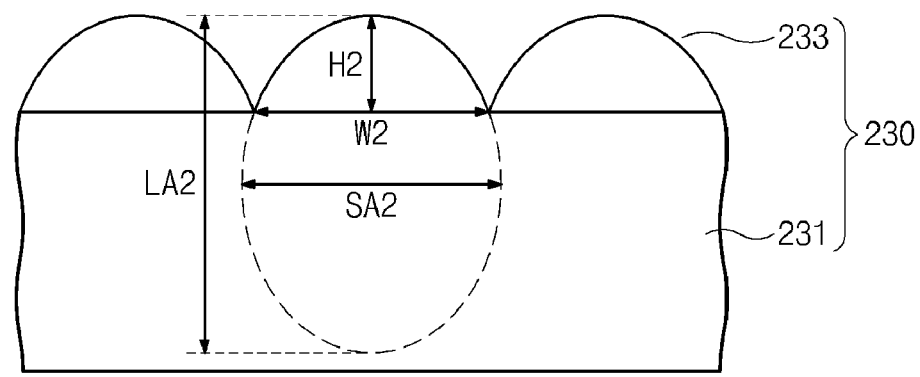

FIG. 6 is a sectional view showing an optical member of an LCD according to a second exemplary embodiment of the present invention, and FIGS. 7A and 7B are enlarged sectional views showing first and second protrusions illustrated in FIG. 6, respectively. The LCD according to the second exemplary embodiment of the present invention is substantially identical to the LCD according to the first exemplary embodiment of the present invention except for the optical member. Thus, the following description will be focused on the optical member 251 and description of the other elements will be omitted in order to avoid redundancy.

Referring to FIG. 6, the optical member 251 includes third and fourth diffusion plates 220 and 230. The third diffusion plate 220 includes a third base 221 and first protrusions 223 provided on the third base 221, and the fourth diffusion plate 230 includes a fourth base 231 and second protrusions 233 provided on the fourth base 231.

The first and second protrusions 223 and 233 have microlens shapes, so that the light passing through the first and second protrusions 223 and 233 is refracted. In one embodiment of the invention, such protrusions have an elliptical profile, with the long axes of the ellipses oriented in a direction perpendicular to the plane defined by the third base 221. Thus, when the light generated from the first and second lamps LP1 and LP2 passes through the third diffusion plate 220, the light is diffused by the first protrusions 223. In addition, when the light passes through the fourth diffusion plate 230 via the third diffusion plate 220, the light is diffused by the second protrusions 233. The surface curvature of each first protrusion 223 is greater than the surface curvature of each second protrusion 233. This will be described in more detail with reference to FIGS. 7A and 7B.

Referring to FIG. 7A, each first protrusion 223 protrudes from the third base 221 by a first height H1 in a range of about 80 μm to about 95 μm. In addition, a first width W1 of the bottom of each first protrusion 223 is in a range of about 200 μM to about 220 μm. Further, when an ellipse extending from the first protrusion is formed, a value obtained by dividing the long axis LA1 of the ellipse by the short axis SA1 of the ellipse is about 1.72 to about 1.92.

Referring to FIG. 7B, each second protrusion 233 protrudes from the fourth base 231 by a second height H2 in a range of about 50 μM to about 65 μM. In addition, a second width W2 of the bottom of each second protrusion 233 is in a range of about 200 μM to about 220 μM. Further, when an ellipse extending from the second protrusion is formed, a value obtained by dividing the long axis LA2 of the ellipse by the short axis SA2 of the ellipse is about 1.21 to about 1.41.

FIG. 8 is a sectional view showing an optical member of an LCD according to a third exemplary embodiment of the present invention. The LCD according to the third exemplary embodiment of the present invention is substantially identical to the LCD according to the first exemplary embodiment of the present invention except for the optical member. Thus, the following description will be focused on the optical member 252 and description of the other elements will be omitted in order to avoid redundancy.

Referring to FIG. 8, the optical member 252 includes the third diffusion plate 220 shown in FIG. 6 and the second diffusion plate 240 shown in FIG. 4. The third diffusion plate 220 is closer to the first and second lamps LP1 and LP2 when compared with the second diffusion plate 240. The second diffusion plate 240 is spaced apart from the first and second lamps LP1 and LP2 while interposing the third diffusion plate 220 therebetween.

The light generated from the first and second lamps LP1 and LP2 is primarily diffused by the third diffusion plate 220 and then secondarily diffused by the second diffusion plate 240.

Figure 9:
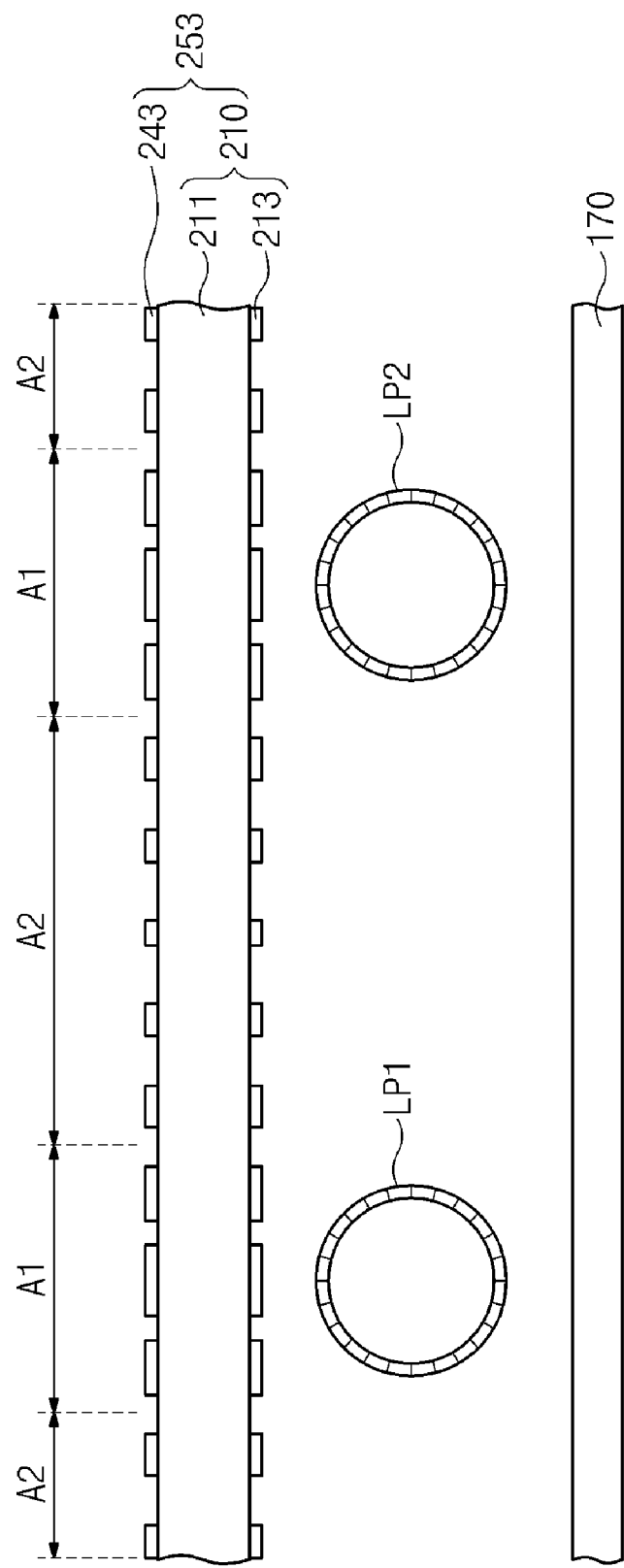
FIG. 9 is a sectional view showing an optical member of an LCD according to a fourth exemplary embodiment of the present invention.

FIG. 9 is a sectional view showing an optical member of an LCD according to a fourth exemplary embodiment of the present invention. The LCD according to the fourth exemplary embodiment of the present invention is substantially identical to the LCD according to the first exemplary embodiment of the present invention except for the optical member. Thus, the following description will be focused on the optical member 253 and description of the other elements will be omitted in order to avoid redundancy.

Referring to FIG. 9, the optical member 253 includes a first base 211, first light-quantity adjusting members 213 and second light-quantity adjusting members 243. The first light-quantity adjusting members 213 are provided on a first surface of the first base 211 and the second light-quantity adjusting members 243 are provided on a second surface of the first base 211 that is opposite to the first surface of the first base 211.

A structure 210 including the first base 211 and the first light-quantity adjusting members 213 is identical to the first diffusion plate 210 shown in FIG. 4. However, different from the optical member 250 according to the first exemplary embodiment of the present invention, the optical member 253 according to the fourth exemplary embodiment of the present invention includes the second light-quantity adjusting members 243, which are provided on the first base 211 while facing the first light-quantity adjusting members 213. That is, according to the fourth exemplary embodiment of the present invention, the first and second light-quantity adjusting members 213 and 243 are provided on the opposite surfaces of the first base 211, respectively.

Figure 10:
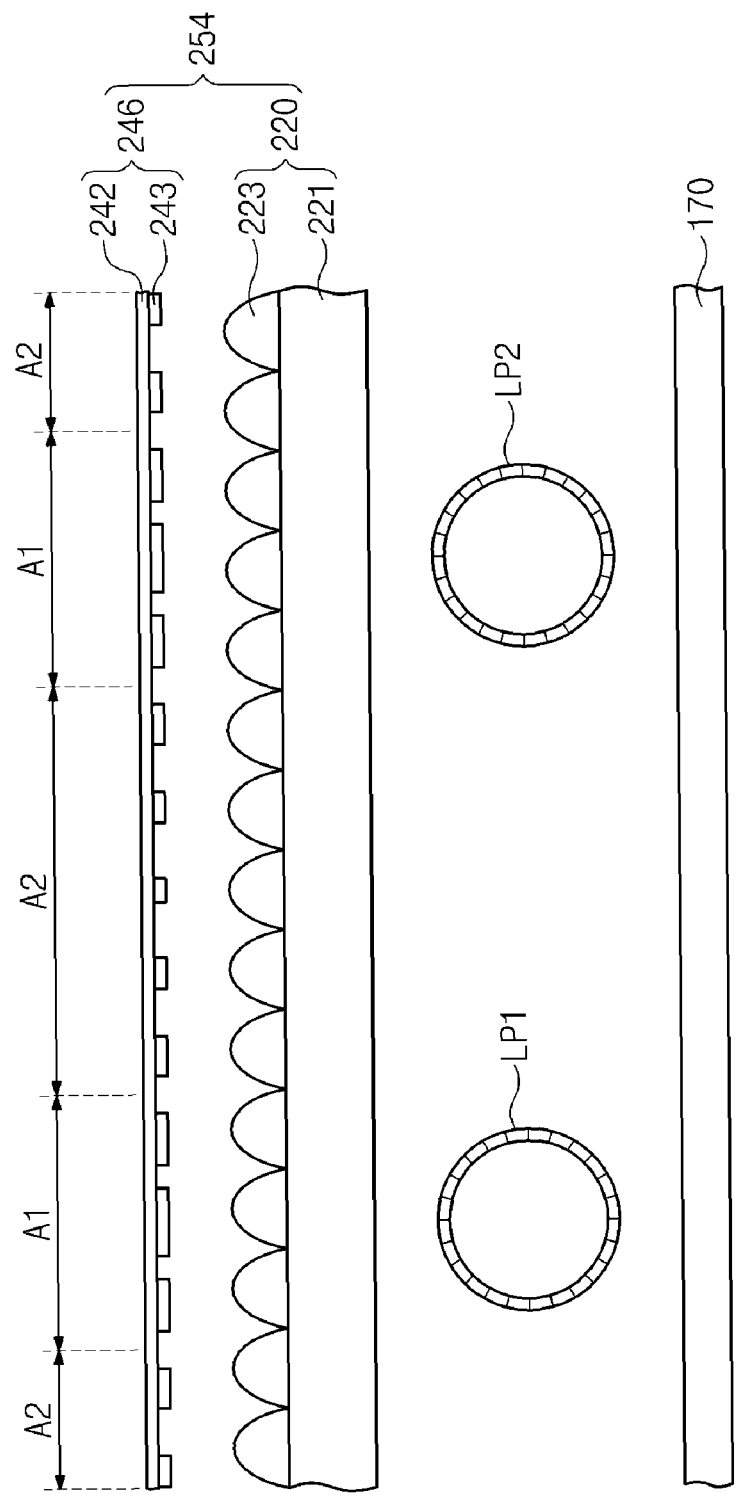
FIG. 10 is a sectional view showing an optical member of an LCD according to a fifth exemplary embodiment of the present invention.

FIG. 10 is a sectional view showing an optical member of an LCD according to a fifth exemplary embodiment of the present invention. The LCD according to the fifth exemplary embodiment of the present invention is substantially identical to the LCD according to the first exemplary embodiment of the present invention except for the optical member. Thus, the following description will be focused on the optical member 254 and description of the other elements will be omitted in order to avoid redundancy.

Referring to FIG. 10, the optical member 254 includes the third diffusion plate 220 and the diffusion sheet 246, similar to the diffusion sheet 240 shown in FIG. 4.

The diffusion sheet 246 includes a fifth base 242 and second light-quantity adjusting members 243 shown in FIG. 4. The fifth base 242 includes material, such as polyethylene terephthalate (PET), and the fifth base 242 has a thickness smaller than that of the third base 221, so that the fifth base 242 has flexibility. In addition, the fifth base 242 is provided thereon with diffusion beads (not shown) including transflective material, such as titanium dioxide ($TiO_2$), and a binder (not shown) that fixes the diffusion beads to the surface of the fifth base 242 to diffuse the light passing through the diffusion sheet 246.

According to the above, the backlight assembly includes first and second diffusion members that are designed to have light transmittance that may complementarily vary according to areas. Thus, an optical member capable of supplying light having uniform brightness onto the whole display area of the LCD can be easily designed. The different embodiments of optical members described herein may be used interchangeably.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a plurality of lamps that generate light while being spaced apart from each other; and
an optical member that receives the light from the lamps to diffuse the light,
wherein the optical member comprises:
a first diffusion member that diffuses the light; and
a second diffusion member having a light transmittance lower than that of the first diffusion member in a first area corresponding to a position of the lamps and higher than that of the first diffusion member in a second area corresponding to a gap between two adjacent lamps.

2. The backlight assembly of claim 1, wherein the first diffusion member is provided between the lamps and the second diffusion member to diffuse the light generated from the lamps, and the second diffusion member diffuses the light that has passed through the first diffusion member.

3. The backlight assembly of claim 2, wherein the first diffusion member comprises:
a first base; and
first light-quantity adjusting members comprising a transflective material and disposed on the first base to adjust quantity of light exiting from the first base by adjusting a size of an area that overlaps the first base, and
the second diffusion member comprises:
a second base; and
second light-quantity adjusting members comprising a transflective material and disposed on the second base to adjust quantity of light exiting from the second base by adjusting a size of an area that overlaps the second base.

4. The backlight assembly of claim 3, wherein the light transmittance of the first and second diffusion members is gradually increased from the first area to the second area.

5. The backlight assembly of claim 3, wherein sizes of the first and second light-quantity adjusting members are gradually reduced from the first area to the second area.

6. The backlight assembly of claim 3, wherein points are defined on surfaces of the first and second bases, the points are arranged in a first direction and a second direction, which is perpendicular to the first direction, at a regular interval, the points defined on the surface of the first base correspond to centers of the first light-quantity adjusting members in one-to-one correspondence, and the points defined on the surface of the second base correspond to centers of the second light-quantity adjusting members in one-to-one correspondence.

7. The backlight assembly of claim 6, wherein a distance between two points adjacent to each other in the first direction corresponds to a first length, a distance between two points adjacent to each other in the second direction corresponds to a second length, the first length is in a range of about 1.5 mm to about 3 mm, and the second length is in a range of about 1 mm to about 2 mm.

8. The backlight assembly of claim 7, wherein a rectangle with first sides having a length corresponding to a half of the first length and second sides having a length corresponding to the second length is defined, and a value obtained by dividing an area of one first light-quantity adjusting member, which overlaps the first base at a maximum range, by an area of the rectangle is smaller than a value obtained by dividing an area of one second light-quantity adjusting member, which overlaps the second base at a maximum range, by the area of the rectangle.

9. The backlight assembly of claim 8, wherein a value obtained by dividing an area of one first light-quantity adjusting member, which overlaps the first base at a minimum range, by the area of the rectangle is greater than a value obtained by dividing an area of one second light-quantity adjusting member, which overlaps the second base at a minimum range, by the area of the rectangle.

10. The backlight assembly of claim 8, wherein a ratio of the area of the rectangle to the area of one first light-quantity adjusting member, which overlaps the first base at the maximum range, is 5:3 to 5:4, and a ratio of the area of the rectangle to the area of one second light-quantity adjusting member, which overlaps the second base at the maximum range, is 5:4 to 5:4.5.

11. The backlight assembly of claim 9, wherein a ratio of the area of the rectangle to the area of one first light-quantity adjusting member, which overlaps the first base at the minimum range, is 10:1 to 10:3, and a ratio of the area of the rectangle to the area of one second light-quantity adjusting member, which overlaps the second base at the minimum range, is 10:1 to 10:3.

12. The backlight assembly of claim 3, wherein at least one of the first and second bases comprises a flexible sheet.

13. The backlight assembly of claim 1, wherein the first diffusion member comprises:
- a base; and
- first light-quantity adjusting members comprising a transflective material and disposed on a first surface of the base to adjust quantity of light exiting from the base by adjusting a size of an area that overlaps the base, and the second diffusion member comprises:
- second light-quantity adjusting members comprising a transflective material and disposed on a second surface of the base, which is opposite to the first surface of the base, to adjust quantity of light exiting from the base by adjusting a size of an area that overlaps the base.

14. The backlight assembly of claim 13, wherein the light transmittance of the first and second diffusion members is gradually increased from the first area to the second area.

15. The backlight assembly of claim 13, wherein sizes of the first and second light-quantity adjusting members are gradually reduced from the first area to the second area.

16. A liquid crystal display comprising:
- a plurality of lamps that generate a light while being spaced apart from each other;
- a liquid crystal display panel that receives the light to display an image; and
- an optical member provided between the lamps and the liquid crystal display panel to diffuse the light, which is generated from the lamps and forwarded to the liquid crystal display panel, wherein the optical member comprises:
- a first diffusion member that diffuses the light; and
- a second diffusion member having a light transmittance lower than that of the first diffusion member in a first area corresponding to a position of the lamps and higher than that of the first diffusion member in a second area corresponding to a gap between two adjacent lamps.

17. The liquid crystal display of claim 16, wherein the first diffusion member comprises:
- a first base; and
- first light-quantity adjusting members comprising a transflective material and disposed on the first base to adjust quantity of light exiting from the first base by adjusting a size of an area that overlaps the first base, and the second diffusion member comprises:
- a second base; and
- second light-quantity adjusting members comprising a transflective material and disposed on the second base to adjust quantity of light exiting from the second base by adjusting a size of an area that overlaps the second base.

18. The liquid crystal display of claim 17, wherein the light transmittance of the first and second diffusion members is gradually increased from the first area to the second area.

19. The liquid crystal display of claim 17, wherein sizes of the first and second light-quantity adjusting members are gradually reduced from the first area to the second area.

20. The liquid crystal display of claim 16, wherein the first diffusion member comprises:
- a base; and
- first light-quantity adjusting members comprising a transflective material and disposed on a first surface of the base to adjust quantity of light exiting from the base by adjusting a size of an area that overlaps the base, and the second diffusion member comprises:
- second light-quantity adjusting members comprising a transflective material and disposed on a second surface of the base, which is opposite to the first surface of the base, to adjust quantity of light exiting from the base by adjusting a size of an area that overlaps the base.

* * * * *